(12) United States Patent
Noce et al.

(10) Patent No.: US 11,916,742 B1
(45) Date of Patent: Feb. 27, 2024

(54) SYSTEM AND METHOD FOR AN AUCTION-BASED SCHEME FOR SERVICE FUNCTION CHAIN PLACEMENT

(71) Applicant: Dell Products L.P., Round Rock, TX (US)

(72) Inventors: Julia Drummond Noce, Rio de Janeiro (BR); Ana Cristina Bernardo de Oliveira, Rio de Janeiro (BR); Anselmo Luiz Éden Battisti, Niterói (BR); Débora Christina Muchaluat Saade, Rio de Janeiro (BR); Evandro Luiz Cardoso Macedo, Rio de Janeiro (BR); Flávia Coimbra Delicato, Niterói (BR); Juan Lucas Do Rosário Vieira, São Gonçalo (BR); Paulo de Figueiredo Pires, Niterói (BR); Marina Ivanov, Chiador (BR)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/183,458

(22) Filed: Mar. 14, 2023

(51) Int. Cl.
*H04L 41/0893* (2022.01)
*G06Q 30/08* (2012.01)
*H04L 41/122* (2022.01)

(52) U.S. Cl.
CPC ......... *H04L 41/0893* (2013.01); *G06Q 30/08* (2013.01); *H04L 41/122* (2022.05)

(58) Field of Classification Search
None
See application file for complete search history.

(56) References Cited

U.S. PATENT DOCUMENTS

| | | | |
|---|---|---|---|
| 2017/0318097 A1* | 11/2017 | Drew | H04L 41/0897 |
| 2018/0220358 A1* | 8/2018 | Reith | H04W 48/02 |
| 2018/0227244 A1* | 8/2018 | Zhang | H04L 41/122 |
| 2019/0222521 A1* | 7/2019 | Flinck | H04L 45/02 |
| 2022/0166626 A1* | 5/2022 | Madisetti | H04L 41/40 |
| 2023/0043675 A1* | 2/2023 | Liu | H04L 45/04 |
| 2023/0261878 A1* | 8/2023 | Madisetti | H04L 9/3236 709/227 |

* cited by examiner

*Primary Examiner* — Atta Khan
(74) *Attorney, Agent, or Firm* — Chamberlain, Hrdlicka, White, Williams & Aughtry; Aly Z. Dossa (57) ABSTRACT

A method for managing a service function chain (SFC) includes obtaining, by a SFC orchestrator of a first domain, a SFC creation request for a SFC, in response to the SFC creation request: generating a domain participation list of a set of potential domains that may service the SFC creation request, sending a bid request to each of the set of potential domains, receiving bid responses from the set of potential domains, ranking the set of potential domains, sending a SFC placement request to a second domain of the set of potential domains based on the ranking, and obtaining a SFC placement response from the second domain, wherein the SFC placement response specifies success of SFC placement in the second domain.

20 Claims, 10 Drawing Sheets

SYSTEM AND METHOD FOR AN AUCTION-BASED SCHEME FOR SERVICE FUNCTION CHAIN PLACEMENT

BACKGROUND

Computing devices may provide services. To provide the services, the computing devices may include hardware components and software components. The services provided by the computing devices may be limited by these components.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a domain in accordance with one or more embodiments of the invention.

FIG. 3.1 shows a flowchart of a method for implementing an auction-based scheme to service a SFC creation request in accordance with one or more embodiments of the invention.

FIG. 3.2 shows a flowchart of a method for servicing a bid request in accordance with one or more embodiments of the invention.

FIG. 3.3 shows a flowchart of a method for servicing a SFC placement request in accordance with one or more embodiments of the invention.

FIGS. 4.1-4.3 shows diagrams of the operation of an example system over time in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing service function chains (SFCs). Specifically, embodiments of the invention relate to managing requests for installing virtual resources of the SFCs in hardware resources based on an allocation scheme of a network function virtualization (NFV) domain (also referred to simply as "domain"). The SFCs may be a designated order of a set of elements to be performed by hardware resources of the domain. The elements may include one or more instances of virtual network functions and one or more services. Embodiments of the invention may include performing an assignment of a SFC to a domain. The assignment of the virtual network functions ("VNFs") and services in a SFC to the domain may be based on an auction-based scheme. The auction based scheme includes using a decision domain that obtains a request for creating a SFC. The decision domain sends bid requests to each of a set of participating domains (e.g., a set of domains that may potentially assign their corresponding resources to perform the elements of the SFC). Based on responses to the bid requests, the decision domain ranks the set of participant domains and sends a SFC placement request to a highest ranked participant domain. The selected domain may return a response that either confirms the servicing of the SFC placement request or rejects the SFC placement. If the response indicates a rejection of the SFC placement, the decision domain may select the next highest ranked domain and send the SFC placement. The selection of a domain may continue until one domain sends a response of a successful SFC placement.

Various embodiments of the invention are described below.

Figure 11:
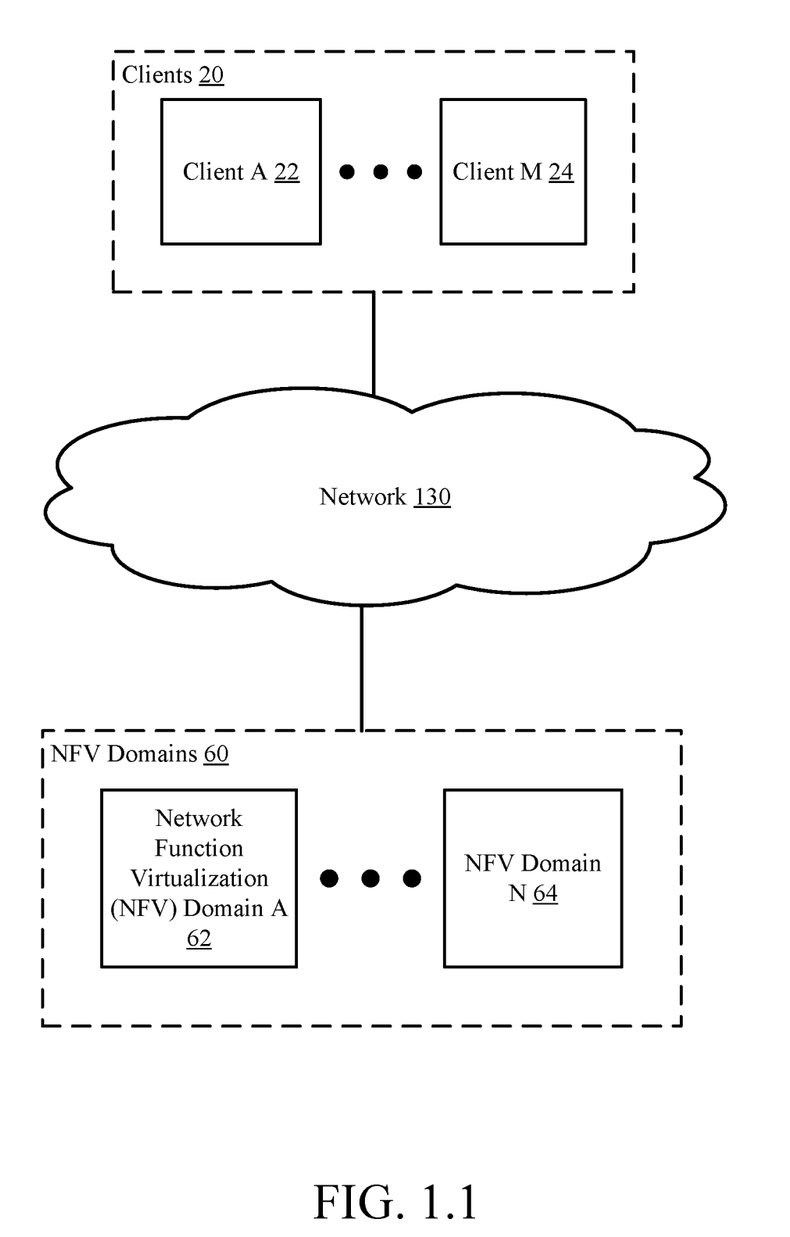

FIG. 1.1 shows a system in accordance with one or more embodiments of the invention. The system may include any number of NFV domains (60) and any number of clients (20). The NFV domains (60) (also referred to as domains) may provide computer implemented services to the clients (22, 24). The computer implemented services may include, for example, database services, data storage services, electronic communications services, data protection services, and/or other types of services that may be implemented using domains.

The domains (60) of the system of FIG. 1.1 may operate independently and/or cooperatively to provide the computer implemented services. For example, a single domain (e.g., 62) may provide a computer implemented service (e.g., an SFC) on its own (i.e., independently) while multiple other domains (e.g., 62, 64) may provide a second computer implemented service cooperatively (e.g., each of the multiple other domains may provide similar and or different services that form the cooperatively provided service).

Figure 12:
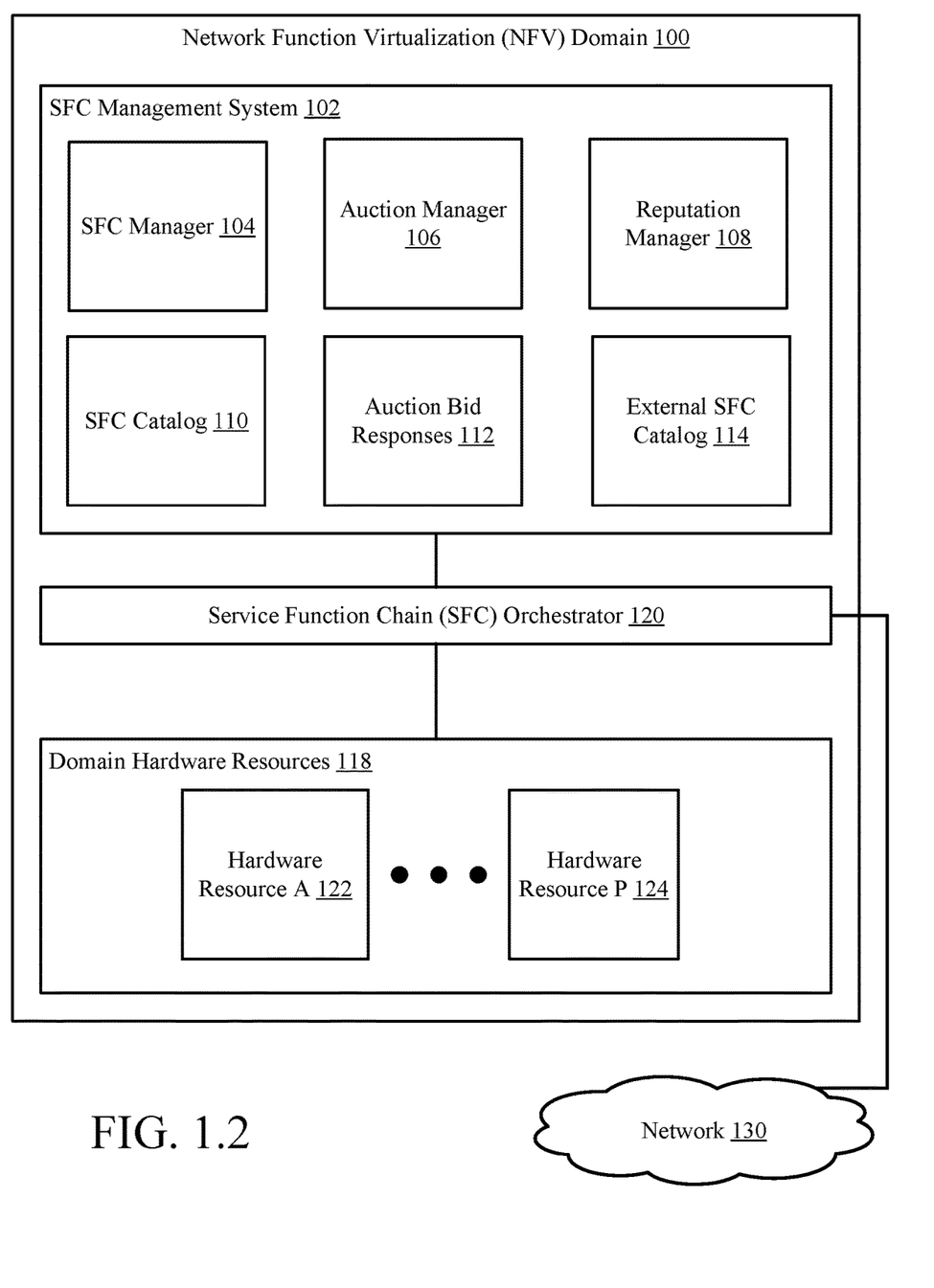

In one or more embodiments, a SFC is a process for executing a set of elements in a specified order. The elements may include at least one or more virtual network functions (VNFs). In one or more embodiments of the invention, a VNF is an application that provides network functionality for a client (22, 24) while accessing a service. Examples of network functionality include, but are not limited to: a firewall instance, an intrusion detection, a login instance, a network traffic monitoring agent, and a network usage monitoring agent. The VNF may provide an abstraction of the network functionality from a computing device such that the network functionality may not be limited to a single computing device (e.g., a computing device of a domain (62, 64)). In this manner, the VNFs may be deployed to the computing devices of a domain (62, 64) by a corresponding SFC orchestrator (discussed below in FIG. 1.2).

To provide computer implemented services such as SFCs, the domains (60) may utilize computing resources provided by specialized hardware devices (also referred to as specialized hardware resources). The specialized hardware resources may include, for example, processing resources, storage resources, memory resources, graphics processing resources, communications resources, and/or other types of resources provided by the hardware devices. Various hardware devices may provide these computing resources.

Figure 33:
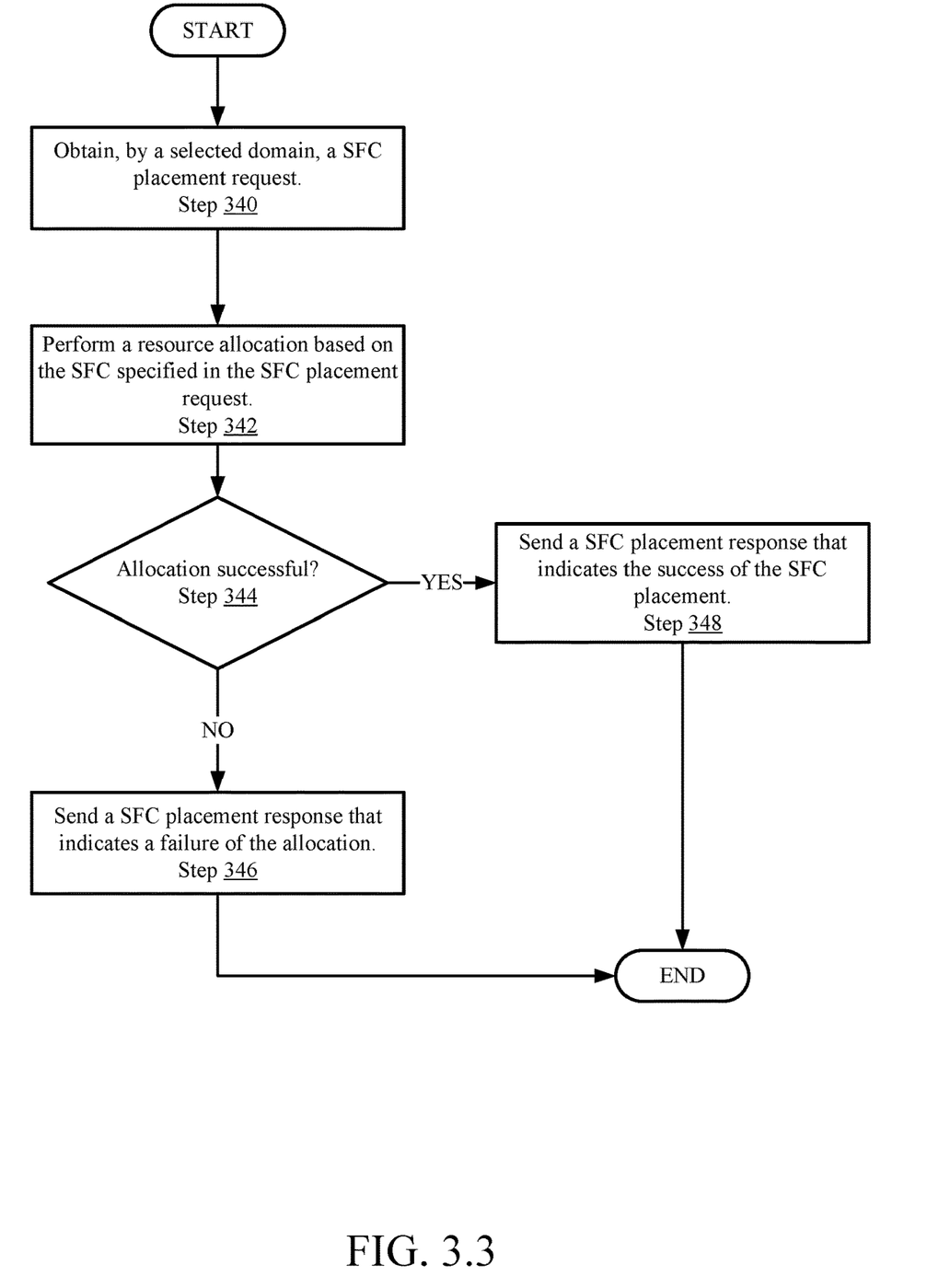

In one or more embodiments of the invention, any of the domains (62, 64) may serve as a primary site for executing virtual resources for clients (not shown). The primary site may be easily accessible for the clients. In contrast, one or more of the domains (62, 64) may operate as a disaster recovery (DR) environment. In one or more embodiments of the invention, the DR environment is a system of components that execute a copy of the virtual resources of a primary site. The DR environment may be available as an alternative environment for the clients should the primary site experience an unexpected failure. Further discussion regarding the DR environment and/or the primary site may be found in, for example, FIG. 3.3.

While the domains (60) have been illustrated and described as including a limited number of specific components, a domain in accordance with embodiments of the invention may include additional, fewer, and/or different components without departing from the invention.

While the domains are illustrated throughout the application as a single entity, the domains may each be implemented as a logical entity that includes any number of computing devices (see, e.g., FIG. 5) that execute the functionality of the domain (or of the specialized hardware resources) described throughout this application.

In one or more embodiments of the invention, the clients (20) may utilize computing resources and/or access data of the domains (60) based on terms established between the clients (22, 24) and the domains (62, 64). The clients (20) may communicate with the SFC orchestrator of at least one of the domains (62, 64) to agree upon terms for accessing the computing resources. For example, each client (22, 24) may include functionality for sending SFC creation requests that specify creating a SFC and to provide the service of the SFC to the clients (22, 24).

Figure 31:
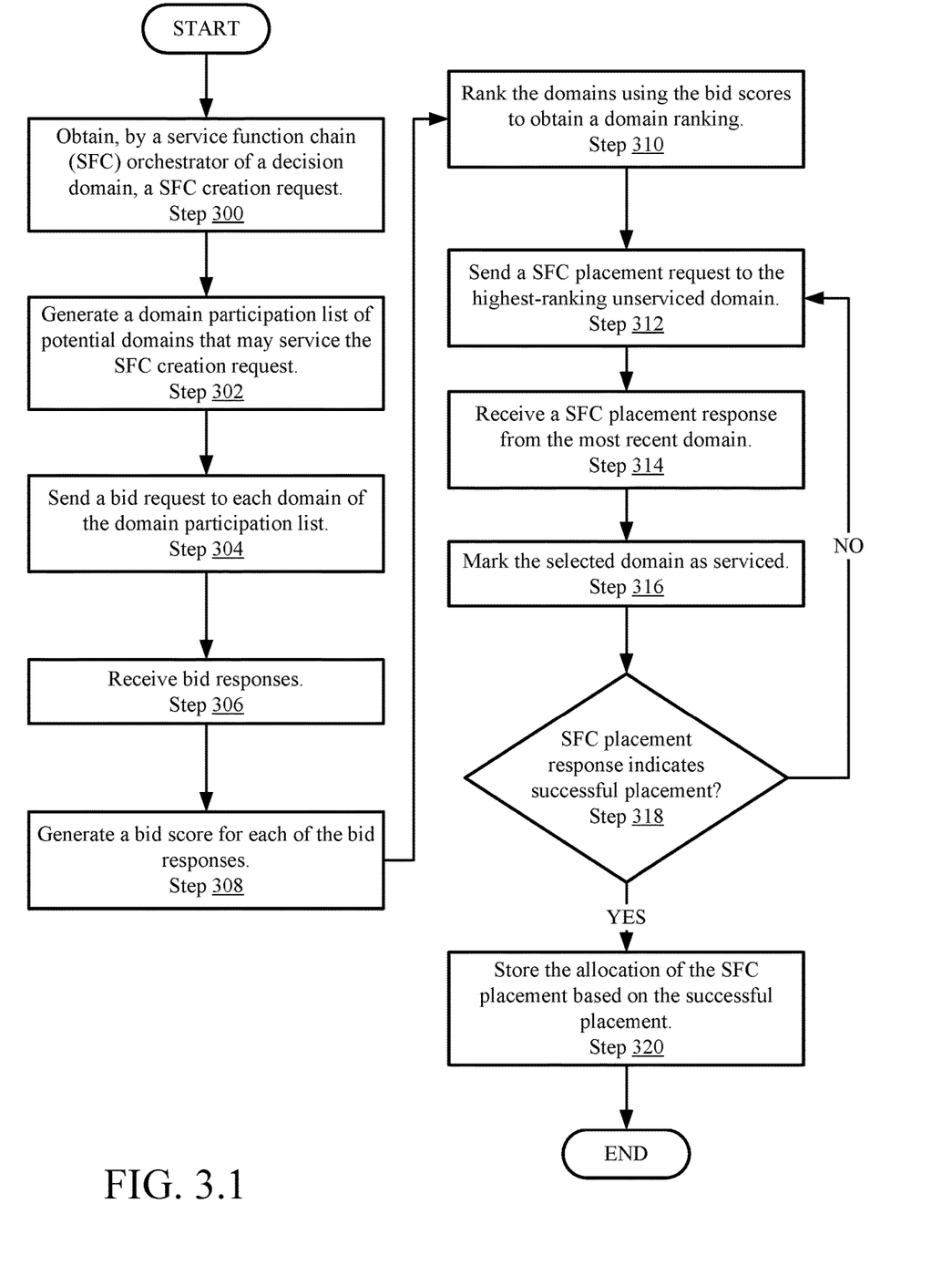

In one or more embodiments, a domain that receives a SFC creation request is deemed a decision domain. In one or more embodiments, the decision domain implements an auction-based scheme to determine which domain (62, 64) is to perform the SFC. In one or more embodiments, the auction-based scheme includes communicating with a set of participating domains by sending bid requests to the participating domains, obtaining bid responses, and based on the bid responses, ranking the participating domains and selecting a highest-ranking domain from the set to service the SFC. If the selected domain is unable to service the SFC, the next highest-ranking domain is selected. The auction-based scheme may be performed, for example, in accordance with FIG. 3.1.

In one or more embodiments of the invention, the set of participant domains is selected by the decision domain based on factors such as, for example, a network connection available between the participant domains and the client sending the SFC creation request, a preemptive determination of the resource availability of the participant domains, and a reputation (discussed below in FIG. 1.2) of the participant domains.

In one or more embodiments, each of the domains (62, 64) may perform the functionality of the decision domain or a participant domain discussed throughout this invention. For example, a first domain (62) may perform the functionality of the decision domain for a first SFC creation request and perform the functionality of a participant domain for a second SFC creation request.

Figure 5:
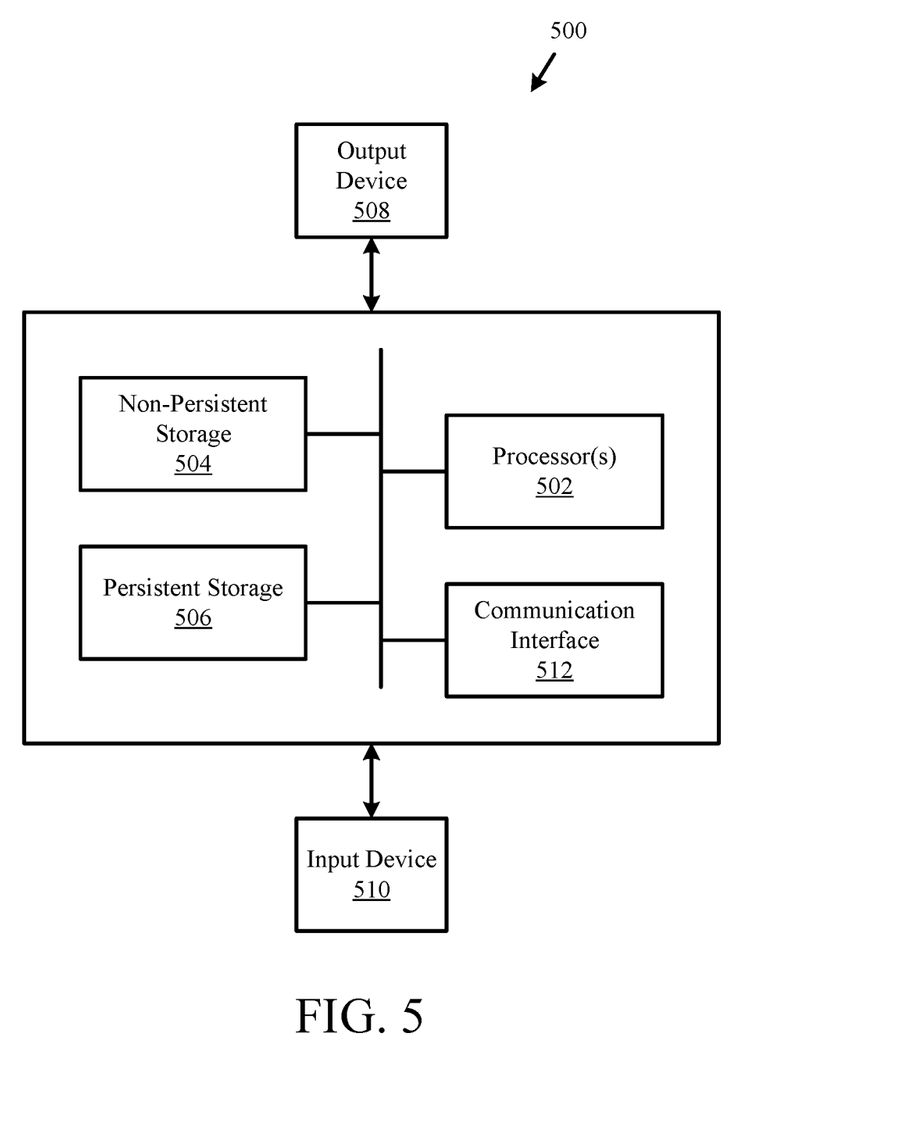
FIG. 5 shows a diagram of a computing device in accordance with one or more embodiments of the invention.

In one or more embodiments of the invention, each client (22, 24) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (22, 24) described throughout this application.

A client (22, 24) may be implemented as a logical device without departing from the invention. The logical device utilizes computing resources of any number of physical computing devices to provide the functionality of the client (22, 24) described throughout this application.

Turning to FIG. 1.2, FIG. 1.2 shows a diagram of a domain (100) in accordance with one or more embodiments of the invention. Any of the domains (e.g., 62, 64) of FIG. 1.1 may be similar to the domain (100) illustrated in FIG. 1.2.

As discussed above, the domain (100) may provide any quantity and type of computer implemented services such as service function chains (SFCs). To provide the computer implemented services, resources of the domain may be used to instantiate one or more composed domains. The composed domains may provide the computer implemented services.

To provide computer implemented services, the domain (100) may include a SFC management system (102). The SFC management system (102) may perform resource allocation services to allocate workloads and/or virtual resources to the hardware resource set (110). The SFC management system (102) may obtain requests for allocating the virtual resources and/or workloads, and the SFC management system (102) may perform various methods for allocating the requested virtual resources and/or workloads to the hardware resource set (110). The such various methods may be those described in FIGS. 3.1-3.3.

The SFC management system (102) may include a SFC manager (104) that includes functionality for managing the SFCs being implemented in the NFV domain (100). The SFC manager (102) may coordinate with other domains (e.g., 62, 64, FIG. 1.1) of the system for the tracking of SFC placements. The SFC manager (104) may further include functionality for monitoring the VNF instances performing on the domain (100) to collect data such as, for example, telemetry information to perform any auto-scaling tasks to migrate any SFCs based on the workload on the domain hardware resources (118). The SFCs implemented in the domain (102) may be tracked using a data structure such as a SFC catalog (110).

The SFC manager (104) may further track the SFCs implemented by other domains using an external SFC catalog (114). The external SFC catalog (114) may be a data structure that stores information about SFCs that have been offloaded (e.g., via the auction-based scheme or via other selection mechanisms) to other domains. Such information may be useful for rerouting purposes. For example, if a client sends a request to the domain (100) associated with a SFC that has been offloaded, the SFC manager (104), or another entity, may read the external SFC catalog (114) to determine where the SFC is implemented to respond to the client request.

The SFC management system (102) may further include an auction manager (106) that includes functionality for orchestrating the auction-based scheme in accordance with, e.g., FIG. 3.1. Specifically, the auction manager (106) may, in response to a SFC creation request, send bid requests to other domains and receive auction bid responses (112). The auction bid responses (112) may be used to rank the domains. The ranking may be used to select a winning domain to implement the SFC specified in the SFC creation request. In one or more embodiments, the auction manager (106) may orchestrate the auction-based scheme in accordance with, e.g., FIG. 3.1. The auction-based scheme may be orchestrated via any other mechanism without departing from the invention.

In one or more embodiments, the auction manager (106) is utilized if the domain (100) performs the role of the decision domain discussed throughout this disclosure.

The SFC management system (102) may further include a reputation manager (108) that includes functionality for managing the reputations of the domain (100) and/or other domains (e.g., 62, 64, FIG. 1.1) of the system. The reputations may be managed by tracking a success rate of SFC placements in the domain and the other domains. The success rate may specify the frequency in which a domain is selected to service a SFC and the frequency in which such domain successfully places the SFC in its domain for implementation. The reputations tracked by the domain (100) may be localized (e.g., relative to the domain (100)) or global (e.g., relative to the system of FIG. 1.1) without departing from the invention.

The SFC management system (102) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the domain (100) described in this application and/or all, or a portion, of the methods illustrated in FIGS. 3.1-3.3. The SFC management system (102) may be implemented using other types of computing devices without departing from the invention. For additional details regarding computing devices, refer to FIG. 5.

In one or more embodiments of the invention, the domain (100) may include a hardware resource set (110). The hardware resource set (110) may include any number and type of hardware devices including, for example, one or more processors, any quantity and type of processor dedicated memory, and any number of local hardware resources (122, 124).

For example, the hardware resource set (110) may include hardware resources (122, 124) operably connected to the SFC management system (102) via the SFC orchestrator (120). The hardware resources (122, 124) may include any number and type of hardware devices that provide computing resources. For additional details regarding the domain hardware resources (122, 124), refer to FIG. 2.

In one or more embodiments of the invention, the SFC orchestrator (120) is a device that facilitates the orchestration of SFCs and the deployment of elements of the SFCs in the domain (100). The SFC orchestrator (120) may perform the methods of FIGS. 3.1-3.3 to facilitate the orchestration. For example, if the domain is a decision domain, the SFC orchestrator (120) may perform the methods of FIG. 3.1 to facilitate the auction-based scheme. If the domain is a participant domain, the SFC orchestrator (120) may perform the methods of FIGS. 3.2-3.3 to service any requests obtained from the decision domain.

The SFC orchestrator (120) may be implemented using any suitable interconnection technology including, for example, system buses such as compute express links or other interconnection protocols. For example, the SFC orchestrator (120) may be implemented as a peripheral component interconnect express (PCIe) device. The SFC orchestrator (120) may support any input/output (IO) protocol, any memory protocol, any coherence interface, etc. The SFC orchestrator (120) may support processor to device connections, processor to memory connections, and/or other types of connections. The SFC orchestrator (120) may be implemented using one or more hardware devices including circuitry adapted to provide the functionality of the SFC orchestrator (120).

In some embodiments of the invention, the domain hardware resources (118) may be implemented as separate physical devices. In such a scenario, the SFC orchestrator (120) may include one or more networks enabling these resource sets to communicate with one another. Consequently, any of these resources (e.g., 118, 120) may include network interface controllers or other devices to enable the hardware devices of the respective resource sets to communicate with each other.

The network (130) may correspond to any type of network and may be operably connected to the Internet or other networks thereby enabling the domain (100) to communicate with any number and type of other devices (e.g., other domains).

The domain (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the domain (100) described in this application and/or all, or a portion, of the methods illustrated in FIGS. 3.1-3.3. The domain (100) may be implemented using other types of computing devices without departing from the invention. For additional details regarding computing devices, refer to FIG. 5.

While the domain (100) has been illustrated and described as including a limited number of specific components, a domain in accordance with embodiments of the invention may include additional, fewer, and/or different components without departing from the invention.

Figure 2:
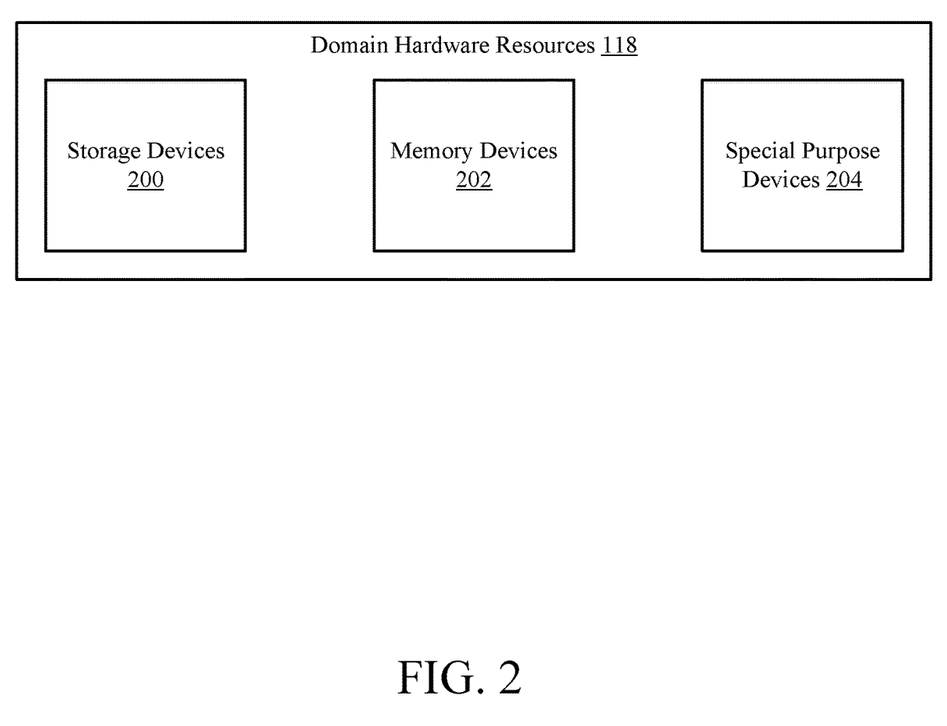
FIG. 2 shows a diagram of local hardware resources in accordance with one or more embodiments of the invention.

Turning to FIG. 2, FIG. 2 shows a diagram of the hardware resources (118) in accordance with one or more embodiments of the invention. As noted above, the SFC management system may present resources including, for example, some of the hardware resources (118) to implement a SFC.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed domain may store data including any type and quantity of information. The virtual allocation manager or other entities may perform preferential writes of data to the storage devices (200). In other words, the most capable storage device or storage resource of the storage devices (200) may be used to store the data. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a domain may store data including any type and quantity of information. The memory devices (202) may include any type and quantity of devices for storing data. The devices may include, for example, transitory memory such as random access memory, persistent memory such as enterprise class memory or non-volatile memory express (NVMe) devices, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed domains. The special purpose devices (204) may include any type and quantity of devices for providing other types of computing resources. The special purpose devices (204) may include, for example, graphics processing units (GPUs) for providing graphics processing resources, compute accelerators for accelerating corresponding workloads performed by composed domains, application specific integrated circuits (ASICs) for performing other functionalities, digital signal processors for facilitating high speed communications, etc. The special purpose devices (204) may include other types of devices for providing other types of computing resources without departing from the invention.

The manner of operation of these devices i.e., the performance of the aforementioned storage management services, may be transparent to at least a portion of the computing resource sets utilizing these hardware devices for providing computer implemented services. Consequently, even though at least a portion of the resulting composed domain control plane may be unaware of the implementation of these models, the composed domains may still operate in accordance with these models thereby managing the storage of data for composed domains.

While the hardware resources (118) have been illustrated and described as including a limited number of specific components, local hardware resources in accordance with embodiments of the invention may include additional, fewer, and/or different components without departing from the invention.

FIG. 3.1 shows a flowchart of a method for implementing an auction-based scheme to service a SFC creation request in accordance with one or more embodiments of the invention. The method shown in FIG. 3.1 may be performed by, for example, a SFC orchestrator (e.g., 120, FIG. 1.2) of a decision domain. Other components of the system in FIGS. 1.1-1.2 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

Turning to FIG. 3.1, in step 300, a service function chain (SFC) creation request is obtained. In one or more embodiments, the SFC creation request specifies generating and implementing a SFC on a domain in the system. In one or more embodiments of the invention, the SFC creation request further specifies assigning each element of the SFC to a local data system of the domain such that each client may access the functionalities of the respective SFC using the local data systems. The SFC may be associated with a client. An element of a SFC may refer to a VNF or a local data service of the SFC.

Figure 32:
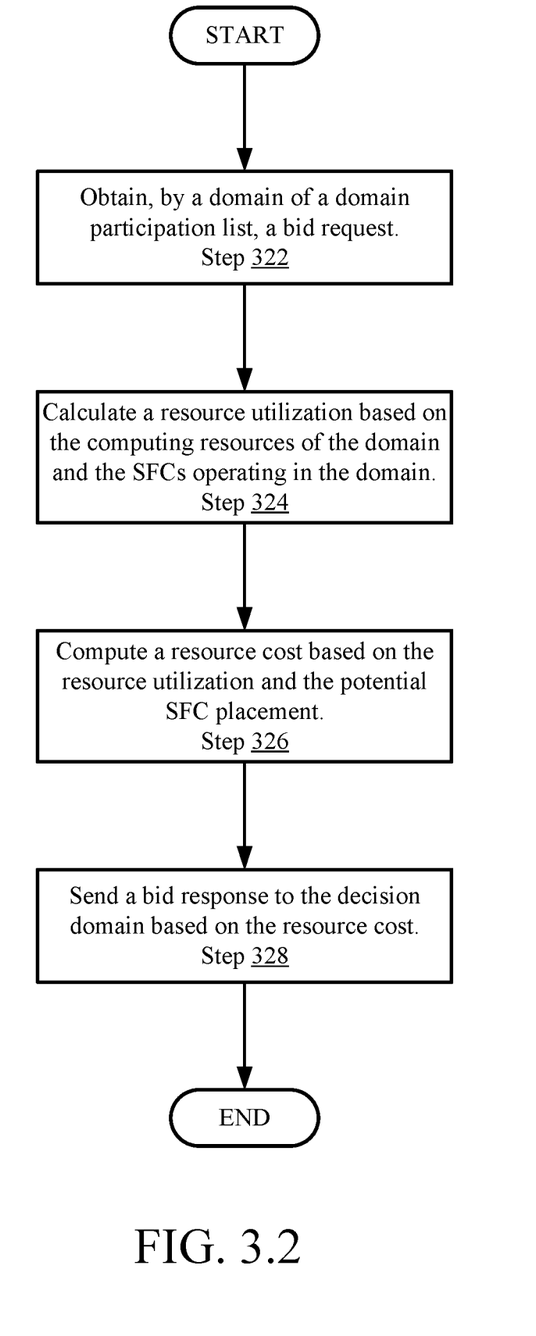

In step 302, a domain participation list of potential domains that may service the SFC creation request is generated. In one or more embodiments, the domain participation list is generated by identifying one or more domains in the system that may potentially implement the SFC. The potential domains may be identified based on factors such as, for example: (i) a reputation of the domains (as tracked by the decision domain), (ii) a network connection between the decision domain and the potential domains, (iii) expressed interest by the potential domains to service future VNF instances of one or more SFCs, (iv) domains that meet security predetermined security requirements, (v) domains that are determined to have the computing resources to service the VNFs of the SFCs, and (vi) any other factors without departing from this disclosure. The potential domains may also be referred to as the participant domains throughout the discussion of FIGS. 3.1-3.3.

In step 304, a bid request is sent to each domain of the domain participation list. In one or more embodiments of the invention, a bid request is a request that specifies obtaining a response by a domain that specifies a resource cost of the requested domain (e.g., one of the participant domains) to be analyzed by the decision domain.

The resource cost may be computed by each of the participant domains in accordance with FIG. 3.2. The result of the bid requests may be one or more bid responses issued by the participant domains and sent to the decision domain.

In step 306, bid responses are obtained by the decision domain from the participating domains. The bid responses may be obtained by the auction manager of the decision domain and provided to the SFC orchestrator of the decision domain. In one or more embodiments, the bid response indicates a monetary cost to implement the SFC in the respective participant domain. The monetary cost may be determined based on factors discussed, e.g., in FIG. 3.2.

In step 308, a bid score is generated for each of the bid responses. In one or more embodiments, the bid scores are generated using values obtained in the bid responses (e.g., generated in accordance with FIG. 3.2 by each participant domain) and based on additional information stored by the decision domain. The additional information may include, for example the reputation of the participant domains and an inter-domain cost. In one or more embodiments, the inter-domain cost may be a value based on the network connectivity between a source (e.g., the client), and a destination of the VNF instances in the SFC.

In one or more embodiments, the bid score of a participant domain may be calculated by inputting the reputation of the participant domain, the monetary cost specified in the bid response of the participant domain, and the inter-domain cost into a function that outputs the bid score. The inputting of the respective monetary costs, reputations, and inter-domain costs into the function may be performed for each participant domain to obtain the bid scores. Each bid score may correspond to a participant domain.

In step 310, the participant domains are ranked using the bid scores to obtain a domain ranking. In one or more embodiments of the invention, the participant domains are ranked by ordering the bid scores either from lowest to highest if a low value of the bid score represents a more favorable selection, or from highest to lowest if a high bid score represents a more favorable selection In step 312, a SFC placement request is sent to the highest-ranking unserviced domain. In one or more embodiments, the SFC placement request specifies assigning the elements of the SFC to the selected domain.

In one or more embodiments, the participant domain is unserviced if it has not been previously selected (e.g., if steps 312-318 have previously been performed).

In one or more embodiments, the selected participant domain may perform the method of FIG. 3.3 to service the SFC placement request and generate a SFC placement response to send to the decision domain.

In step 314, a SFC placement response is received from the most recent domain. In one or more embodiments of the invention, the SFC placement response specifies whether the SFC placement was successful in the selected domain. The SFC placement response may be generated by the participant domain in accordance with FIG. 3.2.

In step 316, the selected domain is marked as serviced.

In step 318, a determination is made about whether the SFC placement response indicates a successful placement. If the SFC placement response indicates a successful placement, the method proceeds to step 320; otherwise, the method proceeds to step 312.

In step 320, following the determination that the SFC placement was successful, the allocation of the SFC placement is stored. In one or more embodiments of the invention, the allocation of the SFC placement is stored on an entry of the external SFC catalog of the decision domain. The entry of the external SFC catalog may specify the selected domain that successfully allocated its resources to implement the SFC. This selected domain may be further referred to as the successful domain.

Further, the decision domain may update the reputations of the successful domain (e.g., by increasing the value of the reputation of this domain) and of any selected domains that indicated a failure to place the SFC in their resources (e.g., by decreasing the value of the reputation of these domains).

In one or more embodiments, the decision domain may further facilitate any data flow to the successful domain based on the network connections between the source (e.g., the client) and the destination for the SFC. For example, if the connection to the successful domain by the client is via the decision domain, the decision domain may provide any requested or required channels to connect the client to the services of the SFC in the successful domain.

FIG. 3.2 shows a flowchart of a method for servicing a bid request in accordance with one or more embodiments of the invention. The method shown in FIG. 3.2 may be performed by, for example, a SFC orchestrator (e.g., 120, FIG. 1.2) of a participant domain. Other components of the system in FIGS. 1.1-1.2 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 322, a bid request is obtained. In one or more embodiments, the bid request is one of the bid requests sent in step 304 of FIG. 3.1.

In step 324, a resource utilization is calculated based on the computing resources of the domain and the SFCs operating in the domain. In one or more embodiments, the participant domain may identify the resource utilization of its resources (e.g., hardware resources and any VNF instances executing therein). The resource utilization may be calculated by determining the total computing resources, storage resources, and other specialized resources and comparing this to the resources being used to service one or more other SFCs (if any).

In step 326, a resource cost is computed based on the resource utilization and the potential SFC placement. In one or more embodiments, the resource cost is computed by inputting the resource utilization and additional parameters into a cost analysis function to output the resource cost. The additional parameters may include, for example, the computing resources required for each VNF instance of the SFC, the memory required for each VNF instance of the SFC, a network requirement for the SFC across nodes in the participant domain, and a discount applied to the cost. In one or more embodiments, the discount is a value that reduces the resource cost based on a predetermined number and/or a number of VNF instances already executing on the nodes of the participant domain that may also be used to execute the requested SFC. This discount may be applied to the cost analysis function to provide a more favorable value of the resource cost (e.g., a lower value).

In step 328, a bid response is sent to the decision domain based on the resource cost. In one or more embodiments, the bid response specifies the resource cost computed in step 326. Alternatively, the bid response specifies a normalized value associated with the resource cost that is readable by the decision domain and is used for calculating the bid scores as discussed in FIG. 3.1.

In one or more embodiments, the participant domain determines that it does not want to participate in the SFC placement auction. In such embodiments, steps 326 and 328 may not be performed, and the bid response may indicate a request to not be included in the auction-based scheme.

FIG. 3.3 shows a flowchart of a method for servicing a SFC placement request in accordance with one or more embodiments of the invention. The method shown in FIG. 3.3 may be performed by, for example, a SFC orchestrator (e.g., 120, FIG. 1.2) of a participant domain. Other components of the system in FIGS. 1.1-1.2 may perform all, or a portion, of the method of FIG. 3.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 340, a SFC placement request is obtained. In one or more embodiments, the SFC placement request is the SFC placement request sent in step 312 of FIG. 3.1. As discussed above, the SFC placement request specifies assigning elements (e.g., VNF instances) to nodes of the participant domain that was selected in FIG. 3.1 (also referred to herein as the selected domain).

In step 342, a resource allocation is performed based on the SFC specified in the SFC placement request. In one or more embodiments, a SFC orchestrator of the selected domain identifies the available resources (e.g., nodes or hardware resources) in the domain and attempts to allocate the resources to each element in the SFC. If all elements are allocated to be implemented, the allocation may be deemed successful. If one or more elements are not allocated (e.g., if not enough resources are available), the allocation may be deemed a failure.

In step 344, a determination is made about whether the allocation is successful. If the allocation is successful, the method proceeds to step 348; otherwise, the method proceeds to step 346.

In step 346, after determining that the allocation is not successful, a SFC placement response is sent that indicates a failure of the allocation. In one or more embodiments, the SFC placement response is the SFC placement response discussed in step 314 of FIG. 3.1.

In step 348, following the determination that the SFC placement allocation is successful, a SFC placement response is sent that indicates that the SFC placement is successful. In one or more embodiments, the SFC placement response is the SFC placement response discussed in step 314 of FIG. 3.1.

Figure 41:
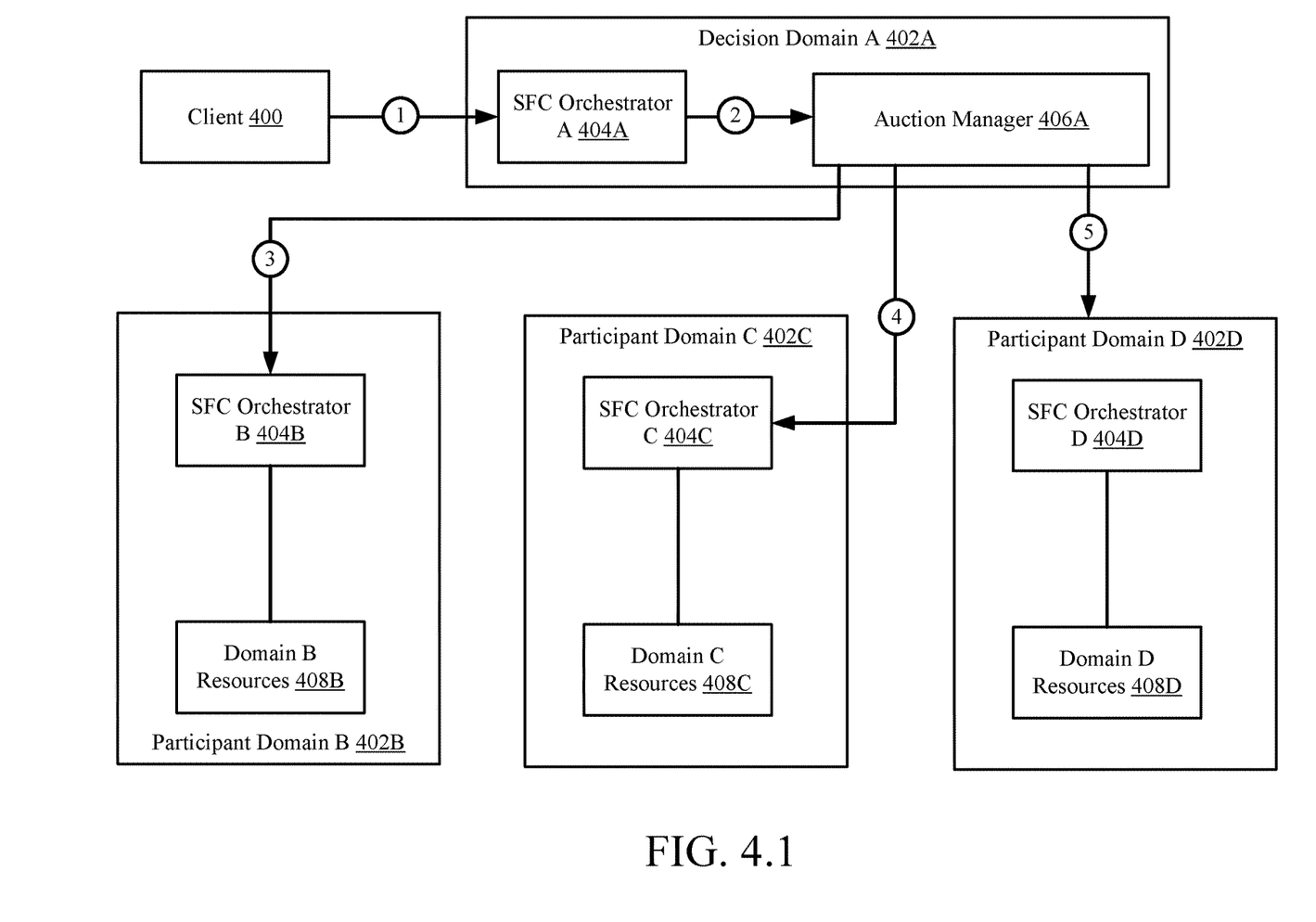
Figure 42:
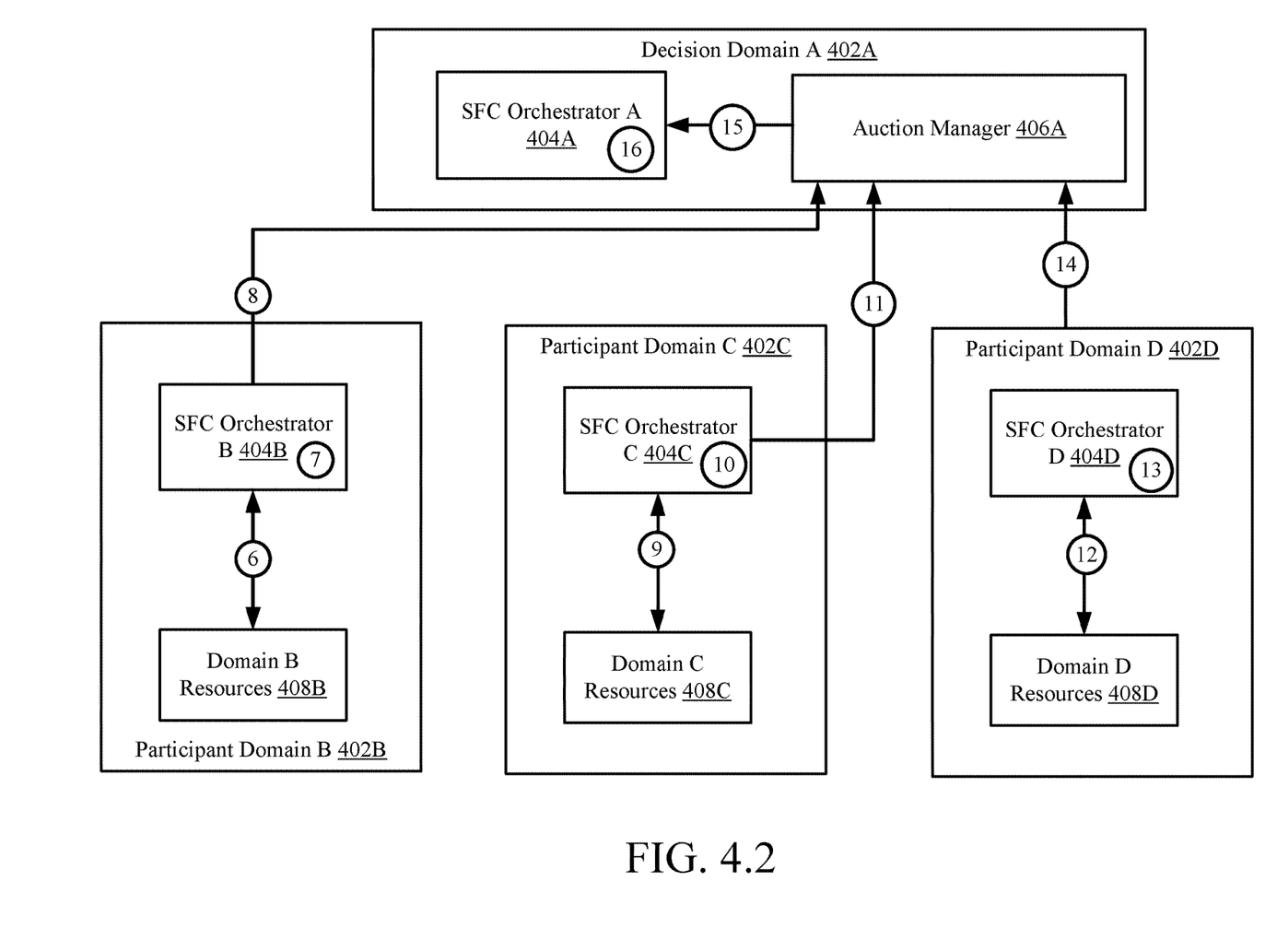
Figure 43:
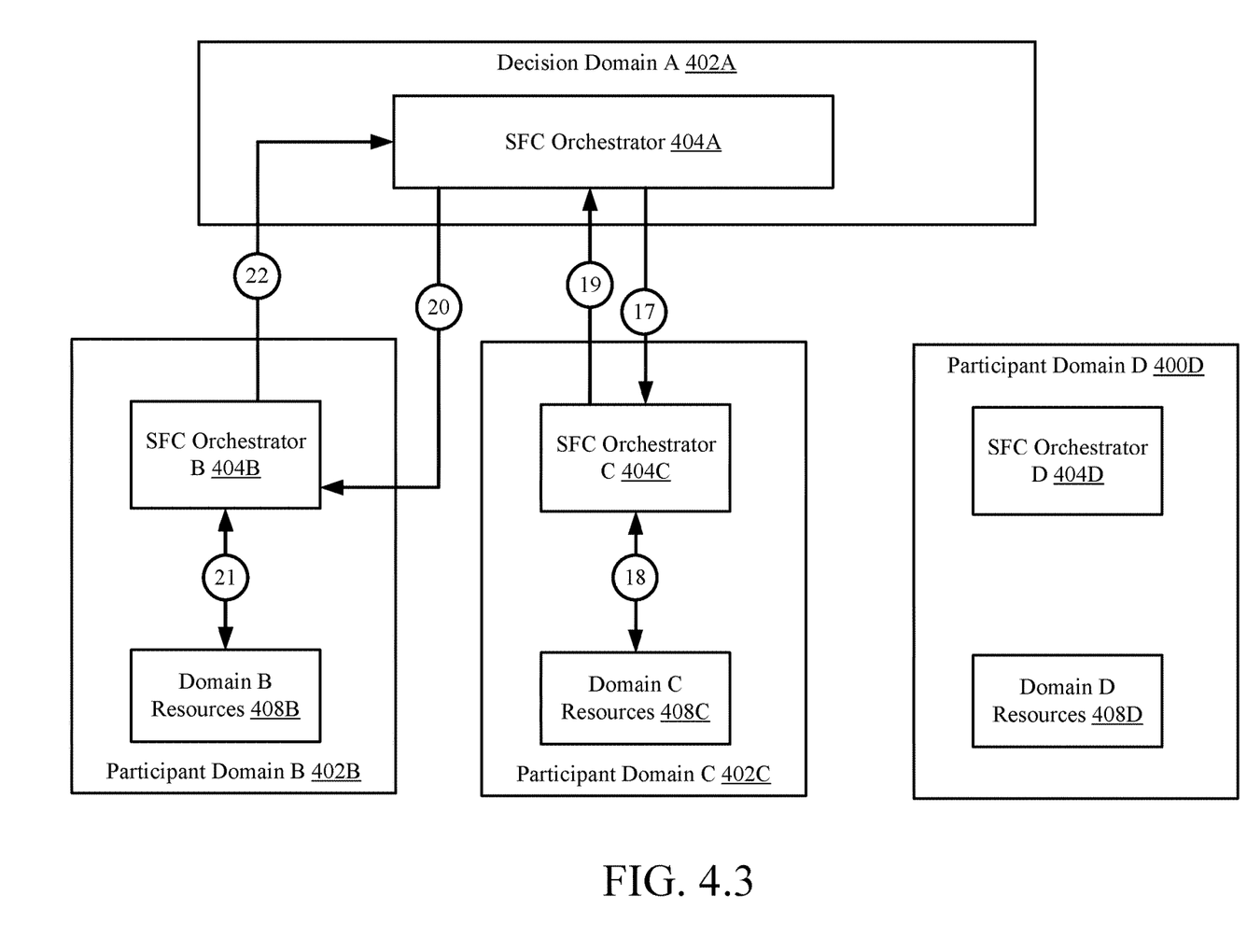

To further clarify embodiments of the invention, a non-limiting example is provided in FIGS. 4.1-4.3. For the sake of brevity, only a limited set of components of the system of FIGS. 1.1-2 is illustrated in FIGS. 4.1-4.3. Actions performed in FIGS. 4.1-4.3 may be illustrated using circled numbers and described below using bracketed numbers (e.g., "[1]").

EXAMPLE

Turning to the example, consider a scenario in which a service function chain (SFC) includes a video game server with a firewall and an intrusion detection instance. A client (400) may send a SFC creation request to implement the SFC in one of four available domains (domain A (402A), domain B (402B), domain C (402C), and domain D (402D)).

Turning to FIG. 4.1, at a first point in time, the client sends a SFC creation request to a SFC orchestrator (404A) of domain A (402A) [1]. The SFC creation request specifies implementing the elements of the SFC (i.e., the video game server, the firewall, and the intrusion detection instance). Because domain A (402A) is the domain to receive the SFC creation request from the client (400), domain A (402A) is deemed the decision domain.

In response to the SFC creation request, the SFC orchestrator A (404A) initiates the auction-based scheme by notifying an auction manager (406A) of the decision domain (402A) of the SFC creation request [2]. The auction manager (406A) in response, identifies a set of participant domains that may potentially implement the SFC. The set of participant domains includes domains B, C, and D (402B, 402C, 402D). The auction manager, after identifying this set, generates a bid request that specifies the SFC to be implemented and requests a bid response from the participant domains (402B, 402C, 402D). The auction manager (406A) sends a bid request to each participant domain (402B, 402C, 402D) [3, 4, 5].

Turning to FIG. 4.2, participant domain B (402B) obtains a first bid request and performs the method of FIG. 3.2 to service the bid request. Specifically, SFC orchestrator B (404B) of participant domain B (402B) generates a first resource cost based on a resource utilization of the domain B resources (408B) [6]. The resource cost is generated by inputting the resource utilization of the domain B resources (408B) to a cost analysis function to output the first resource cost [7]. The resource cost is provided to the auction manager (406A) [8].

Similarly, participant domain C (402C) obtains a second bid request and performs the method of FIG. 3.2 to service the second bid request. Specifically, SFC orchestrator C (404C) of participant domain C (402C) generates a second resource cost based on a resource utilization of the domain C resources (408C) [9]. The second resource cost is generated by inputting the resource utilization of the domain C resources (408C) and a discount that accounts for a firewall instance that is already installed on the domain C resources (408C) to a cost analysis function to output the second resource cost [10]. In this example, the second resource cost is lower than the first resource cost. The second resource cost is provided to the auction manager (406A) [11].

Similarly, participant domain D (402D) obtains a third bid request and performs the method of FIG. 3.2 to service the third bid request. Specifically, SFC orchestrator D (404D) of participant domain D (402D) generates a third resource cost based on a resource utilization of the domain D resources (408D) [12]. The third resource cost is generated by inputting the resource utilization of the domain D resources (408D) to a cost analysis function to output the third resource cost [13]. In this example, the third resource cost is lower than the first resource cost but higher than the second resource cost. The third resource cost is provided to the auction manager (406A) [14].

The auction manager (406A) provides the first, second, and third resource cost to SFC orchestrator A (404A) [15]. SFC orchestrator A (404A) generates a bid score for each of the three resource costs in accordance with FIG. 3.1. Specifically, SFC orchestrator A (404A) applies the first resource cost (of participant domain B (402B)) and a reputation of participant domain B (402B) to a function to generate a first bid score. The reputation of participant domain B (402B) is relatively high. Further, SFC orchestrator A (404A) applies the second resource cost (of participant domain C (402C)) and a reputation of participant domain C (402C) to a function to generate a second bid score. The reputation of participant domain C (402C) is relatively high. Because the first resource cost of participant domain B (402B) is lower than the second resource cost (of participant C (402C)) is lower and the reputation is relatively similar, the second bid score is higher (i.e., relatively more favorable) than the first bid score. SFC orchestrator A (404A) applies the third resource cost (of participant domain D (402D)) and a reputation of participant domain D (402D) to a function to generate a third bid score. The reputation of participant domain D (402D) is relatively low due to previous failures to allocate previous SFCs. As such, the third bid score is the least favorable (i.e., the lowest) of the three bid scores.

Based on the generated bid scores, SFC orchestrator ranks the three participant domains (402B, 402C, 402D) [16]. Specifically, the ranking includes ranking participant domain C (402C) first, participant domain B (402B) second, and participant domain D (402D) third.

Turning to FIG. 4.3, based on the ranking, SFC orchestrator A (402A) sends a SFC placement request to SFC orchestrator C (404C) that specifies the allocation of the elements of the SFC to the domain C resources (408C) [17]. SFC orchestrator C (404C) performs the method of FIG. 3.3 to allocate the domain C resources (408C) to the elements of SFC [18]. After the attempted allocation, the SFC orchestrator C (404C) determines that not enough resources are available to allocate the video game server. Based on the determination, the SFC orchestrator C (404C) sends a SFC placement response that indicates a failure to allocate the elements of the SFC [19].

After receiving the first SFC placement response, SFC orchestrator A (404A) sends a second SFC placement request to the next highest-ranking domain (i.e., domain B (402B)) [20]. SFC orchestrator B (404B) performs the method of FIG. 3.3 to service the SFC placement request by allocating the domain B resources (408B) to the elements of SFC [21]. After the attempted allocation, the SFC orchestrator B (404B) determines that the elements are successfully allocated to the nodes of the domain B resources (408B). Based on the determination, the SFC orchestrator B (404B) sends a SFC placement response that indicates a successful allocation of the elements of the SFC [19].

After the SFC placement, the SFC orchestrator A (404A) may generate an entry in an external SFC catalog (not shown) that specifies the allocation of SFC on domain B (402B). Further, the reputations may be updated based on the successful allocation of domain B (402B) and the failure of domain C (402C).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for performing allocation of virtual resources in a domain. Specifically, embodiments of the invention provide an improvement in the selection and allocation of SFCs in a large system of domains by first determining available domains and implementing an auction-based scheme to determine a most efficient domain to service the SFC. Embodiments disclosed herein further provides an efficient method for re-assigning failed attempts to implement a SFC in a new domain. This may be beneficial to systems with a large number of domains and a relatively low success rate.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing service function chains (SFCs), the method comprising:
obtaining, by a SFC orchestrator executing on a first domain, a SFC creation request for a SFC,
wherein the SFC comprises a plurality of virtual network function (VNF) instances,
wherein the first domain comprises a first set of computing devices,
wherein the SFC orchestrator executes on one of the first set of computing devices;
in response to the SFC creation request:
generating a domain participation list of a set of potential domains that may service the SFC creation request;
sending a bid request to each of the set of potential domains;
receiving bid responses from the set of potential domains;
based on the bid responses, ranking the set of potential domains;

sending a SFC placement request to a second domain, based on the ranking, wherein the set of potential domains comprises the second domain; and obtaining a SFC placement response from the second domain, wherein the SFC placement response specifies success of SFC placement in the second domain; and based on the SFC placement response, storing allocation of the SFC placement, wherein the SFC creation request is serviced by hardware resources of the second domain.

2. The method of claim 1, further comprising:
prior to sending the SFC placement request to the second domain:
sending a second SFC placement request to a third domain based on the ranking, wherein the set of potential domains further comprises the third domain; and
obtaining a second SFC placement response, wherein the second SFC placement response specifies failure of performing the SFC placement in the third domain;
wherein the SFC placement request is sent to the second domain further based on the second SFC placement response.

3. The method of claim 2, wherein the third domain is ranked higher than the second domain.

4. The method of claim 1, wherein ranking the set of potential domains comprises:
generating a set of bid scores based on the bid responses, wherein each of the bid responses comprises a resource cost associated with a resource utilization; and
generating a rank for each of the set of potential domains based on the set of bid scores.

5. The method of claim 1, further comprising:
obtaining a second bid request from a third domain, wherein the second bid request is associated with a second SFC;
in response to the second bid request:
calculating a resource cost associated with computing resources; and
sending a bid response to the third domain, wherein the bid response comprises the resource cost.

6. The method of claim 5, further comprising:
obtaining a second SFC placement request from the third domain;
in response to the second SFC placement request:
performing a resource allocation based on the second SFC;
making a determination that the allocation was successful; and
based on the determination, sending a second SFC placement response to the third domain, wherein the second SFC placement response indicates a successful allocation.

7. The method of claim 6, wherein performing the resource allocation comprises allocating each of a plurality of virtual network functions (VNF) instances of the second SFC to hardware resources of the first domain.

8. A system, comprising:
a first domain comprising a SFC orchestrator, operating on a processor; and
memory comprising instructions, which when executed by the processor, cause the processor to perform a method, comprising:
obtaining a SFC creation request for a SFC,
in response to the SFC creation request:

generating a domain participation list of a set of potential domains that may service the SFC creation request;
sending a bid request to each of the set of potential domains;
receiving bid responses from the set of potential domains;
based on the bid responses, ranking the set of potential domains;
sending a SFC placement request to a second domain, based on the ranking, wherein the set of potential domains comprises the second domain; and
obtaining a SFC placement response from the second domain, wherein the SFC placement response specifies success of SFC placement in the second domain; and
based on the SFC placement response, storing allocation of the SFC placement,
wherein the SFC creation request is serviced by hardware resources of the second domain.

9. The system of claim 8, the method further comprising:
prior to sending the SFC placement request to the second domain:
sending a second SFC placement request to a third domain based on the ranking, wherein the set of potential domains further comprises the third domain; and
obtaining a second SFC placement response, wherein the second SFC placement response specifies failure of performing the SFC placement in the third domain;
wherein the SFC placement request is sent to the second domain further based on the second SFC placement response.

10. The system of claim 9, wherein the third domain is ranked higher than the second domain.

11. The system of claim 8, wherein ranking the set of potential domains comprises:
generating a set of bid scores based on the bid responses, wherein each of the bid responses comprises a resource cost associated with a resource utilization; and
generating a rank for each of the set of potential domains based on the set of bid scores.

12. The system of claim 8, the method further comprising:
obtaining a second bid request from a third domain, wherein the second bid request is associated with a second SFC;
in response to the second bid request:
calculating a resource cost associated with computing resources; and
sending a bid response to the third domain, wherein the bid response comprises the resource cost.

13. The system of claim 12, the method further comprising:
obtaining a second SFC placement request from the third domain;
in response to the second SFC placement request:
performing a resource allocation based on the second SFC;
making a determination that the allocation was successful; and
based on the determination, sending a second SFC placement response to the third domain, wherein the second SFC placement response indicates a successful allocation.

14. The system of claim 13, wherein performing the resource allocation comprises allocating each of a plurality of virtual network functions (VNF) instances of the second SFC to hardware resources of the first domain.

15. A non-transitory computer readable medium comprising computer readable program code, which when executed by a computer processor enables the computer processor to perform a method for managing a service function chain (SFC), the method comprising:
  obtaining, by a SFC orchestrator of a first domain, a SFC creation request for a SFC, in response to the SFC creation request:
    generating a domain participation list of a set of potential domains that may service the SFC creation request;
    sending a bid request to each of the set of potential domains;
    receiving bid responses from the set of potential domains;
    based on the bid responses, ranking the set of potential domains;
    sending a SFC placement request to a second domain, based on the ranking, wherein the set of potential domains comprises the second domain; and
    obtaining a SFC placement response from the second domain, wherein the SFC placement response specifies success of SFC placement in the second domain; and
    based on the SFC placement response, storing allocation of the SFC placement,
    wherein the SFC creation request is serviced by hardware components of the second domain.

16. The non-transitory computer readable medium of claim 15, the method further comprising:
  prior to sending the SFC placement request to the second domain:
    sending a second SFC placement request to a third domain based on the ranking, wherein the set of potential domains further comprises the third domain; and
    obtaining a second SFC placement response, wherein the second SFC placement response specifies failure of performing the SFC placement in the third domain;
    wherein the SFC placement request is sent to the second domain further based on the second SFC placement response.

17. The non-transitory computer readable medium of claim 16, wherein the third domain is ranked higher than the second domain.

18. The non-transitory computer readable medium of claim 15, wherein ranking the set of potential domains comprises:
  generating a set of bid scores based on the bid responses, wherein each of the bid responses comprises a resource cost; and
  generating a rank for each of the set of potential domains based on the set of bid scores.

19. The non-transitory computer readable medium of claim 18, the method further comprising:
  obtaining a second bid request from a third domain, wherein the second bid request is associated with a second SFC;
  in response to the second bid request:
  calculating a resource cost associated with a resource utilization of the first domain; and
  sending a bid response to the third domain, wherein the bid response comprises the resource cost.

20. The non-transitory computer readable medium of claim 19, the method further comprising:
  obtaining a second SFC placement request from the third domain;
  in response to the second SFC placement request:
    performing a resource allocation based on the second SFC;
    making a determination that the allocation was successful; and
    based on the determination, sending a second SFC placement response to the third domain, wherein the second SFC placement response indicates a successful allocation.

* * * * *